United States Patent Office 2,820,033
Patented Jan. 14, 1958

2,820,033

PREPARATION OF THIOAMMELINES

Donald W. Kaiser and Richard Parke Welcher, Old Greenwich, Conn., assignors to American Cyanamid Company, New York, N. Y., a corporation of Maine No Drawing. Application October 18, 1956
Serial No. 616,612

1 Claim. (Cl. 260—249.8)

This invention relates to the preparation of thioammelines, and more particularly, to the preparation of such products from a dicyandiamide and an inorganic thiocyanate in the presence of an acidified aqueous medium. Still more specifically, the invention is concerned with the reaction of a dicyandiamide, and inorganic thiocyanate and a mineral acid, all being present in such proportions that the mole ratios of acid and of thiocyanate to dicyandiamide each does not exceed two for each mole of dicyandiamide reacted.

In our copending application for United States Letters Patent, Serial No. 468,568 filed on November 12, 1954, now issued as United States Patent No. 2,780,623, we have shown that thioammeline may be prepared by reacting dicyandiamide with ammonium thiocyanate in an inert organic solvent. Although the latter process produces good yields, it is industrially advantageous wherever possible to avoid the use of organic solvents and to carry out the reaction in an aqueous environment.

Dicyandiamide and ammonium thiocyanate have been reacted previously in an aqueous environment. Unfortunately, the yields either were poor or, as in the method described in Berichte, 20, page 1059, the process was not entirely satisfactory in that thioammeline is not substantially directly made. For example, the Berichte process requires the minimum use of two moles of ammonium thiocyanate and two moles of hydrochloric acid. The mixture is then reacted with one mole of dicyandiamide in an aqueous medium to prepare a red solution which must be concentrated so as to recover, after filtration, a yellow precipitate of thioammeline thiocyanate. It is highly desirable to be able to obtain thioammeline directly without excessive intermediate process steps.

It is an object of the invention to obviate the difficulties of the prior art as noted above.

According to the process of the present invention, despite the previously found results, thioammeline may be prepared substantially directly in a simply maintained aqueous medium. This successful result is obtained through the discovery that it is necessary to use controlled amounts of a dicyandiamide, a thiocyanate and a mineral acid when using water as a solvent. Unexpectedly, the yellow precipitate of thioammeline thiocyanate reported in Berichte (supra) is not formed when the correct mole ratios of acid to thiocyanate and to dicyandiamide are maintained. These ratios must be maintained in the ranges of (0.5–1.8):(0.5–1.8):1.0, respectively.

Moreover, not only can the process of the invention be successfully carried out but yields are as good or better than in the case utilizing an organic solvent. The thioammeline so prepared finds utility as accelerators in the vulcanization of synthetic elastomers of the "neoprene" type.

The reaction is conducted by heating the mixture within a range of from about 50° C. to about 130° C., although reflux temperatures of from about 85° C. to 110° C. are preferred.

It has been found that not only dicyandiamide but also a mono- or a di-substituted dicyandiamide can be used in the present process. Illustrative of the substituted dicyandiamides are N-aryl dicyandiamides, such as N-phenyl dicyandiamides and monoalkyl or dialkyl dicyandiamides such as for example the corresponding N-methyl-, N-ethyl-, N-butyl-, N-dodecyl-, N,N-dimethyl-, N,N-diethyl, N,N-dibutyl and N,N-dinonyl derivatives.

Inorganic thiocyanates can be used with advantage. These include, for instance, ammonium thiocyanate, sodium thiocyanate, potassium thiocyanate and calcium thiocyanate.

It is also an advantage of the present invention that any mineral acid can be successfully used. Illustrative of such acids contemplated are hydrochloric, hydrobromic, sulfuric and phosphoric acids.

As previously stated, the dicyandiamide reactant as well as the thiocyanate and acid can be employed in varying molar quantities, provided that the mole quantity of thiocyanate and/or acid does not exceed the dicyandiamide by a factor of two. It has been found, however, that for optimum operation the molar quantities of acid, dicyandiamide and thiocyanate be in the range of from 1.5 to 1.1 to 1, respectively.

The invention will be illustrated in conjunction with the following examples which are to be taken as illustrative and not by way of limitation. It will be noted that Examples A, B and C following are presented as illustrative of some of the intermediates used in the process of the invention.

EXAMPLE A

*Preparation of N-phenyldicyandiamide*

A solution of calcium dicyanamide (prepared by the addition of 20 moles of cyanogen chloride to a mixture of 22 moles of calcium cyanamide in 10 liters of water) and 55 moles of aniline were heated with agitation to about 73° C. 6N hydrochloric acid was added until a pH of 3 was reached. The solution was cooled and further acidified with additional hydrochloric acid to a pH of 2. Resultant precipitate was centrifuged, washed and dried to give 7.3 kilograms of the product above-identified having a melting point of 192° C.–193° C.

EXAMPLE B

*Preparation of N-dodecyldicyandiamide*

Dodecylamine (10 moles) and butanol (5 liters) were charged to a reaction vessel and the contents heated to obtain a solution. 5 moles of sulfuric acid diluted with 250 ml. of water was added thereto. The pH of the solution increased to 6.9 by adding thereto a 20% solution of sodium hydroxide. Water was removed from the mixture by azeotropic distillation. Sodium dicyanamide was next added and the mixture heated for twenty three hours at from 94° C. to 97° C. with agitation. Butanol distilled off. 4 liters of water was next added and the mixture heated to 90° C. and then further diluted with 10 liters of water and cooled to 18° C. A precipitate was removed by filtration and air-dried. The product weighed 2.48 kilograms, which corresponded to a 96% yield of N-dodecyldicyandiamide.

EXAMPLE C

*Preparation of N,N-dibutyldicyandiamide*

2 moles of dibutylamine, which was dissolved in 750 cc. of Cellosolve, was neutralized by the addition of concentrated sulfuric acid (1 mole) while cooling in an ice bath. The final pH reached was 7.5 to 8. Sodium dicyanamide (2.2 moles) was next added to the so-neutralized dibutylamine solution and the mixture refluxed for three hours. A small amount of carbon dioxide evolved. Resultant reaction mixture was next drowned in 2 liters of cold water. A crystalline precipitate was obtained by filtration and again washed with water and dried to give 372 grams of a light tan solid identified as N,N-dibutyldicyandiamide having a melting point of 72° C. to 73° C. in 95% yield based on the theoretical.

EXAMPLE 1

A mixture of 0.26 mole of dicyandiamide and 0.28 mole of ammonium thiocyanate was heated in water at 93° C. to 97° C. for about two hours while adding 0.28 mole of concentrated hydrochloric acid in small increments slowly thereto. Heating was continued for an additional three and one half hours. The resulting slurry is filtered and washed with water and dried. The product was obtained in 59% yield. This was identified by infra-red spectrometry as thioammeline.

EXAMPLE 2

This example illustrates the omission of acid in the reaction of dicyandiamide and ammonium thiocyanate in an aqueous medium. The thioammeline yield is markedly reduced. Thus, Example 1 is repeated in every material respect except that acid is omitted.

The yield of thioammeline obtained was less than 7%.

EXAMPLE 3

A mixture consisting of 0.26 mole of dicyandiamide and 0.33 mole of ammonium thiocyanate was heated under reflux in an aqueous medium for about two hours while adding concentrated hydrochloric acid (0.33 mole) in small increments during this period. Heating was continued for about an hour and a half. Resultant mixture was cooled and filtered. The filtered product was washed with water and dried. The product obtained in 67% yield was identified as thioammeline.

EXAMPLE 4

0.33 mole of dicyandiamide and 0.26 mole of ammonium thiocyanate were heated under reflux in water for about two hours while adding 0.26 mole of concentrated hydrochloric acid thereto. Heating was continued for an additional hour. The resultant mixture was filtered, washed with water and dried to obtain thioammeline in 70% yield based on the theoretical.

EXAMPLE 5

Example 1 was repeated in every particular except that 0.39 mole of hydrochloric acid was used. The yield of thioammeline was found to be 66%.

EXAMPLE 6

A mixture of 0.31 mole of dicyandiamide and 0.28 mole of ammonium thiocyanate were heated for one hour in water at a temperature of from 100° C. to 105° C. while adding 0.28 mole or 6N sulfuric acid in small increments thereto. The reaction mixture was further heated for an additional three hours. The resultant mixture was cooled, filtered and the filtered product washed with water and dried. Thioammeline in 45% yield was obtained.

EXAMPLE 7

The preceding example was repeated except that both sodium thiocyanate was used instead of ammonium thiocyanate and hydrochloric acid rather than sulfuric acid. The yield of thioammeline was found to be 72%.

EXAMPLE 8

A mixture of 0.38 mole of dicyandiamide and 0.28 mole of sodium thiocyanate was heated in water under reflux for one and one half hours while adding thereto 0.42 mole of hydrochloric acid in small increments. The reaction was continued for an additional three hours. Resultant mixture was filtered and the filtered product was washed with water and dried. The yield of thioammeline was 61%.

EXAMPLE 9

The process of Example 8 was repeated except that 0.31 mole of dicyandiamide was reacted instead of 0.38 mole of dicyandiamide. The yield of thioammeline was found to be 80%.

EXAMPLE 10

A mixture of 1.3 moles of dicyandiamide and 1.2 moles of sodium thiocyanate was heated under reflux for about two hours while adding 1.2 moles of concentrated hydrochloric acid (12N) thereto. The reaction mass was heated for an additional three and one half hours and filtered. The filtered product was cooled, washed with water and dried. The product was identified as thioammeline in 59% yield.

EXAMPLE 11

A mixture of 0.25 mole of N-phenyldicyandiamide and 0.28 mole of potassium thiocyanate was heated under reflux in water while adding 0.38 mole of 6N hydrochloric acid in small increments thereto. The reaction mass was heated for an additional three hours and N-phenylthioammeline was recovered in 69% yield.

EXAMPLE 12

A mixture of 0.2 mole of N,N-dibutyldicyandiamide and 0.28 mole of sodium thiocyanate was heated for about one hour in water under reflux while adding 0.38 mole of hydrochloric acid thereto. The reaction mass was heated for an additional three hours and N,N-dibutylthioammeline was recovered in 94% yield.

EXAMPLE 13

The procedure of Example 12 was followed except that N-dodecyldicyandiamide was substituted for the dibutyldicyandiamide. A yield of 60% of N-dodecylthioammeline was obtained.

The foregoing examples illustrate the use of varying mole proportions of the dicyandiamide, ammonium thiocyanate and the acid to obtain varying yields of thioammeline. Although these examples do not include the step of adding a base to neutralize the resultant mixture after reaction, such addition of base is within the contemplation of the process of this invention, particularly when excess acid is used. Illustrative bases which can be employed are sodium hydroxide, ammonium hydroxide, potassium carbonate and the like.

The products resulting from the process of the hereinafter presented claims find utility as rubber accelerators. An example of such utility is presented below.

EXAMPLE 14

A batch comprising the following is prepared.

| | Parts |
|---|---|
| Neoprene Type W | 100 |
| Phenyl-alphanaphthalene | 2 |
| Stearic acid | 0.5 |
| Light calcined magnesia | 2 |
| Zinc oxide | 5 |
| Semi-reinforcing furnace black | 29 |
| Product of Example 11 | 0.5 |

The batch was thoroughly mixed and test sheets are formed. These sheets are cured for 20 minutes at 153° C. and their physical properties such as modulus at 300% tensile strength and percent elongation are determined and reported as 550 p. s. i., 2250 p. s. i. and 780%, respectively.

We claim:

As a new composition of matter: N-phenylthioammeline.

References Cited in the file of this patent

FOREIGN PATENTS 456,843    Canada _____ May 24, 1949

OTHER REFERENCES

Repthke Deutsche Chemische Gesellschaft Berichte, vol. 20, pages 1059–1060.